US008086882B2

(12) United States Patent
Shah et al.

(10) Patent No.: US 8,086,882 B2
(45) Date of Patent: Dec. 27, 2011

(54) ENERGY MEASUREMENT TECHNIQUES FOR COMPUTING SYSTEMS

(75) Inventors: Aniket A. Shah, Bellevue, WA (US); Alexandre G. Ferreira, Sammamish, WA (US); Huseyin S. Yildiz, Kenmore, WA (US); Jose H. Baldner, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 802 days.

(21) Appl. No.: 12/164,082

(22) Filed: Jun. 29, 2008

(65) Prior Publication Data

US 2009/0327784 A1 Dec. 31, 2009

(51) Int. Cl.
*G06F 1/26* (2006.01)
*G06F 1/00* (2006.01)
*G01R 21/00* (2006.01)
*G01R 21/06* (2006.01)

(52) U.S. Cl. ............. 713/320; 713/300; 702/60; 702/61
(58) Field of Classification Search .................. 713/300, 713/320; 702/60, 61
See application file for complete search history.

(56) References Cited

U.S. PATENT DOCUMENTS

| | | | |
|---|---|---|---|
| 5,560,024 | A | 9/1996 | Harper et al. |
| 5,694,607 | A | 12/1997 | Dunstan et al. |
| 7,222,030 | B2 | 5/2007 | Banginwar et al. |
| 7,234,068 | B2 | 6/2007 | Nonogaki et al. |
| 7,284,139 | B2 | 10/2007 | Watts, Jr. et al. |
| 7,290,246 | B2 | 10/2007 | Cyran et al. |
| 2003/0191976 | A1* | 10/2003 | Cyran et al. ................. 713/340 |
| 2004/0025069 | A1* | 2/2004 | Gary et al. ................... 713/300 |
| 2004/0268159 | A1 | 12/2004 | Aasheim et al. |
| 2007/0220292 | A1 | 9/2007 | Ishihara et al. |
| 2009/0300399 | A1* | 12/2009 | Archer et al. ................. 713/340 |

OTHER PUBLICATIONS

Tiwari et al., "Instruction Level Power Analysis and Optimization of Software", Journal of VLSI Signal Processing, 1996, 18 pages.
"Optimizing Software for Intel Centrino Mobile Technology and Intel NetBurst Microarchitecture" http://softwarecommunity.intel.com/articles/eng/3119.htm.
Intel Corporation, "Application Power Management for Mobility", Mar. 20, 2002, 21 Pages.
Ortiz et al., "High-Level Optimization for Low Power Consumption on Microprocessor-Based Systems", . 50th Midwest Symposium on Circuits and Systems, 2007, MWSCAS 2007, Aug. 5-8, 2007, pp. 1265-1268.
Flinn et al., "PowerScope: A Tool for Profiling the Energy Usage of Mobile Applications", Second IEEE Workshop on Mobile Computing Systems and Applications, 1999. Proceedings WMCSA '99, Feb. 25-26, 1999, pp. 2-10.

* cited by examiner

*Primary Examiner* — Ji H Bae
(74) *Attorney, Agent, or Firm* — Mayer & Williams P.C.

(57) ABSTRACT

An energy measurement system ("EMS") and techniques for correlating energy consumption to computing system activity. The EMS includes a data acquisition module, a processing module, and optionally a visualization module. The data acquisition module receives and transmits to the processing unit a number of sampled data streams, referred to as "data acquisition traces," associated with a computing system under test ("SUT"). The processing module concurrently receives one or more system traces from the SUT, which are produced by particular components under examination by the EMS. Synchronization is established between the data acquisition traces and the system trace(s) when the SUT executes certain predetermined actions to produce data in both the data acquisition traces and the system trace(s), which data is used to logically align the traces. Then, as test scenarios are executed by the SUT, changes are monitored in the traces, and energy consumption is quantified.

18 Claims, 6 Drawing Sheets

# ENERGY MEASUREMENT TECHNIQUES FOR COMPUTING SYSTEMS

BACKGROUND

Energy consumption of computing devices is an on-going area of concern in the computer industry. The ever-increasing processing capacity and hardware complexity of today's computers and portable electronic devices such as phones, media players, personal digital assistants, navigation devices, and the like, leads to higher power consumption. Power requirement is a primary concern for portable devices and computers because it is one of the two factors that determine battery life (the other being battery capacity). Power requirement is also important for desktop and server computers because it directly bears on operating costs of home and office computer systems as well as server farms, because of its effects on energy costs and heat management.

Current efforts to reduce the energy consumption of computing devices are focused in several areas. New battery technologies are being researched to enable higher capacities. Hardware components such as CPUs, peripherals, displays, and the like are being tuned for reduced energy consumption. Code optimizations are employed, in which code changes are made that enable execution of the same task using fewer CPU cycles and/or other resources. Optimizations of the timing of software executions at all levels of system and application software are also used, in order to enable hardware to spend longer periods in lower power states. Other strategies optimize, from a power perspective, interactions of software and hardware. These strategies provide ways to determine how software is interacting with hardware, firmware and other software components with respect to power, and thus provide a way to determine how to better optimize this interaction, such as by keeping unused peripherals turned off or at lower power states.

Strategies for optimizing software for lower energy consumption generally rely on intuitive principles or on a theoretical or specification-based understanding of how and where power is consumed on the system during execution of a given task. In one example, in some systems, if the CPU enters an idle mode for a period of time, the system may transition to a lower power state. In another example, continuous but slow input/output tasks from optical media are recognized to consume more power than reading the same data and caching it in memory. In yet another example, it has been recognized that high rates of direct memory access and/or or interrupt rates tend to lead to higher power consumption. It has further been recognized that selective screen updates for modified window content generally leads to less power consumption compared to updating the entire screen or window area.

In many cases, however, intuitive principles and specification-based policies for implementing power optimizations in software have trade-offs that impact both the resulting power savings and the engineering costs of implementation—and available theoretical information is often not sufficient to accurately determine how much power will actually be saved under various conditions if a certain strategy is implemented. Moreover, unforeseen activity from other parts of a computing system may largely offset the benefits of a particular power optimization.

System-wide energy measurements, which aggregate power contributions of a number of hardware and software components, have been used to gauge the effectiveness of implementing intuitive or specification-based strategies. Such system-wide measurements are, however, generally limited in the amount of useful information that can be ascertained about power consumption of individual computing components, and how the individual activities of such components contribute to energy consumption.

SUMMARY

The energy measurement system and techniques discussed herein provide for ways to measure and quantify energy consumption of (generally, power consumed by) physical and logical components of all types of computing systems, and the power demands associated with individual activities performed via such components.

An exemplary energy measurement system includes a data acquisition module, a processing module, and optionally a visualization module. The data acquisition module receives and transmits to the processing unit a number of sampled analog or digital data streams (which may also include time information), referred to as "data acquisition traces," associated with a particular computing system (the "system under test"). The processing module concurrently receives one or more system traces from the system under test, which are produced by particular components under examination by the energy measurement system. System traces may also include time information. Synchronization is established between the data acquisition traces and the system trace(s) when the system under test executes certain predetermined actions to produce data in both the data acquisition traces and the system trace(s), which data is used to logically align the traces (for example, based on time). Then, as test scenarios are executed by the system under test, changes are monitored in the traces (computationally or via visual constructs such as graphs), and energy consumption of the system under test as a whole, or individual components of the system under test that are under examination, can be measured, post-processed, analyzed, and quantified.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

An energy measurement system and techniques for using the energy measurement system to measure and quantify energy consumption of physical and logical components of all types of computing systems are described herein. The system and techniques discussed herein enable fine-grained correlation of component-level activity to power drawn by a computing system, reducing reliance on intuition and/or abstract theory when optimization efforts are undertaken.

Figure 1:
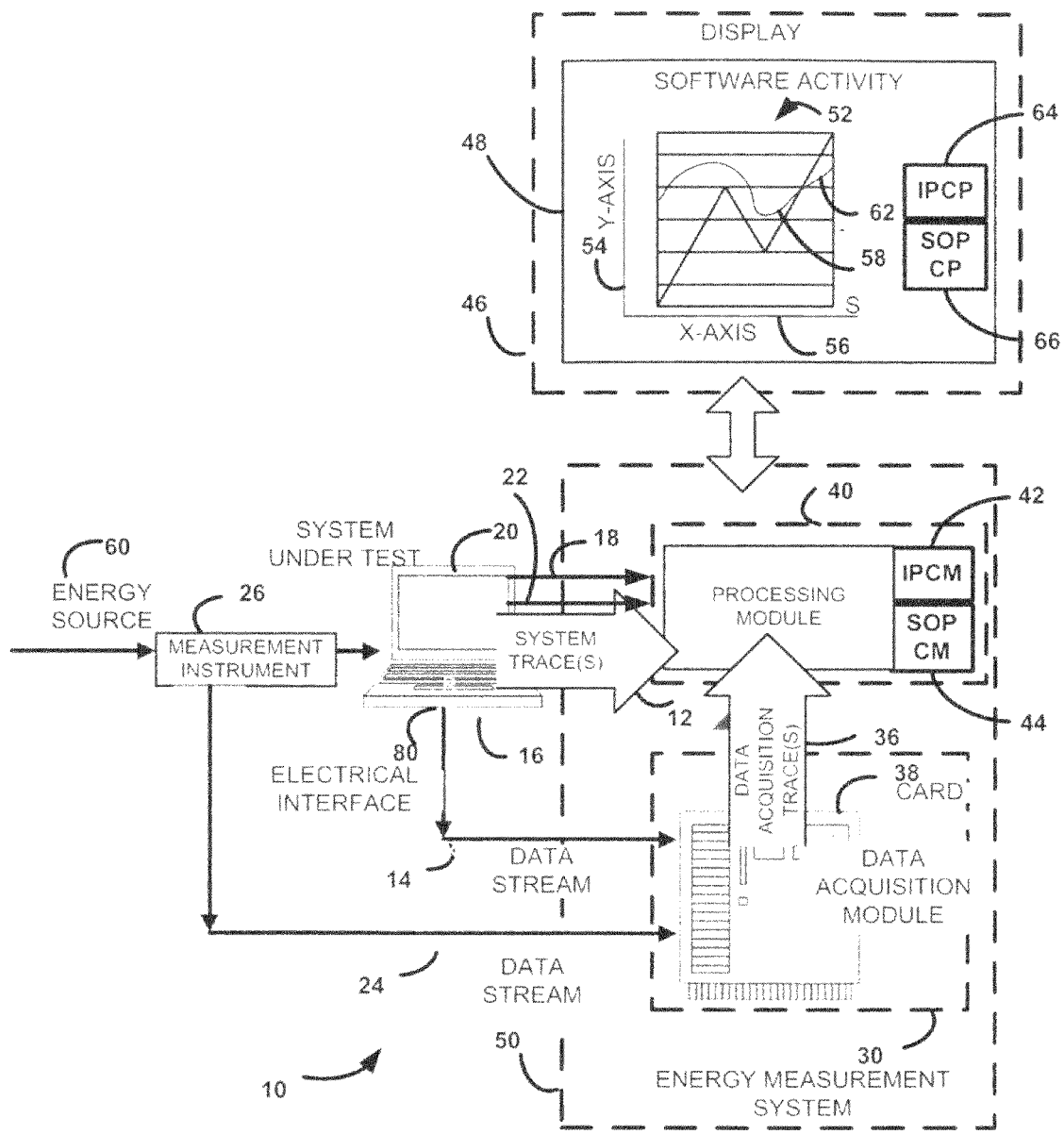
FIG. 1 is a block diagram illustrating an exemplary computing system under test ("system under test") and certain components of an exemplary energy measurement system for measuring and quantifying energy consumption of software, hardware, and firmware components of the system under test.

Turning now to the drawings, where like numerals designate like components, FIG. 1 is a block diagram 10 illustrating an exemplary client- or server-based computing system under test ("system under test") 20 and certain components of an exemplary energy measurement system 50 for measuring and quantifying energy consumption of software, hardware, and firmware components of system under test 20. System under test 20 may be any type of computing device or physical or logical component thereof, including but not limited to a portable consumer electronic device (a media player, a phone, a personal digital assistant, or a navigation device, for example), a personal computer, or a server. System under test 20 includes a number of physical or logical components in the form of hardware, software, firmware, or combinations thereof, operating at any level of the computing system, which access internal or external computing resources such as files, data, devices, programs, objects, radios, displays, computer-readable storage media, and the like, to perform certain functionality of the system under test.

As shown, energy measurement system 50 includes a data acquisition module 30 and a processing module 40. Energy measurement system 50 optionally includes a visualization module (not shown), which is used to render user interface 48 via display 46. When present, the visualization module may be part of or separate from processing module 40.

Data acquisition module 30, which may include a data acquisition card 38, is configured to receive and sample a number of analog or digital data streams (two shown, for purposes of illustration and not limitation) 14, 24 associated with system under test 20. Samples from the analog or digital data streams are generally but not necessarily logged to one or more files, and are collectively referred to as data acquisition traces 36. It will be appreciated that when reference to multiple data acquisition traces are made, such references are not intended for purposes of limitation; for example, one trace with multiple channels may be envisioned, and traces may individually or collectively be portions of the same file or may be different files, as a matter of design choice. Data acquisition traces 36 may also include time information. As shown, data stream 24 is based on an energy source 60 that is input to system under test 20. In an exemplary implementation, data stream 24 is an electrical indicator (a voltage or a current, for example) that is output from a measurement mechanism 26 interfaced with or between energy source 60 and system under test 20. Measurement mechanism 26 may be any desired mechanism. Examples include but are not limited to a resistor bank or a current measurement system. It will be appreciated that the choice measurement mechanism is a matter of design choice, and that depending on the selected mechanism, other electrical indicators may be calculated, derived, or extrapolated. Sampled data stream 24 in the form of a data acquisition trace 36 aids in identifying changes of state in system under test 20, as described more fully below.

Data stream 14 is an electrical signal output from an electrical interface 80 associated with system under test 20. Electrical interface 80 may be any interface associated with system under test 20 that produces measurable electrical activity. One example of electrical interface 80 is a serial port pin. Sampled data stream 14 aids in establishing synchronization between data acquisition traces and system traces, as described more fully below.

Processing module 40 is configured to receive data acquisition traces 36 from data acquisition module 30, and is also configured to concurrently receive one or more system traces 12 from system under test 20. System traces 12 are data streams produced by components of interest of the system under test (for example, hardware, software, or firmware components operating at various layers of a computing environment) as the components operate within the system under test. As described more fully below, it is possible to design certain test scenarios that result in actions being performed by such components of interest and the actions being reflected in system traces 12. It is also possible to design specific trace events that result in actions being performed by such components of interest and the actions reflected in system traces 12.

Synchronization is established between data acquisition traces 36 and system trace(s) 12 when system under test 20 executes certain predetermined actions to produce data in both the data acquisition traces and the system trace(s), which data is used to logically align the traces (in time, for example). It will be understood, however, that actions that produce synchronization data may be executed at any time when data streams that would carry the synchronization data are operational. Such actions to produce data in the system traces are generally indicated by signals 18 and 22 in FIG. 1, and may include actions such as dispatching specific trace events. A custom trace may also be provided by the component of interest. Other traces may also be employed and monitored as the situation calls for. A software trace may be based on both pre-existing instrumentation in system software, as well as custom instrumentation added to the software components being optimized. Each trace event may be associated with a timestamp, with sub-microsecond resolution, and may further be stored in a log file along with the timestamps. In this way, the traces may be plotted on a user interface.

Actions that produce synchronization data in the data acquisition trace or channels thereof may include sending any desired predetermined signals (an example is a data byte) via electrical interface 80. It will be appreciated that the type of signal to be may be determined based on the nature of electrical interface 80 and/or the component of interest. Generally, it has been seen that the delay between simultaneously undertaken actions that produce data in both traces is not below a desired accuracy level, but it is possible to measure and/or predict delays and offset for the delays, so as not to negatively impact synchronization for analysis purposes. Processing module 40 may rely on information in the analog or digital data streams (such a voltage spike in an analog data stream) which appear in a channel of the data acquisition trace. Moreover, an entry in the system trace, which is associated with that fluctuation, appears and is caused to be aligned in time in the correlated trace output. By using this association, processing module 40 accomplishes the correct time alignment of the traces.

Once synchronization has been established (and re-established one or more times as desired, to correct any clock drifts that may be happening across the two, or more, data sets), as test scenarios are executed by the system under test, changes are monitored in the traces, and energy consumption can be measured, post-processed, analyzed, and quantified.

The need for synchronization arises because there are generally two distinct sets of data streams being captured, with reference to two separate time sources (the data acquisition module clock, and the system under test clock), by processing module 40. Given the presence of two such sources, drifts in a reference timing source or any other reference source used for aligning data sets may occur. Another use for synchronization is to provide a mechanism to synchronize start times. In particular, as accuracy is generally required in the sub-millisecond range, most mechanisms to simultaneously start both logging operations will be difficult to employ because of the physical and/or software delays that have a comparatively nondeterministic nature.

As noted above, energy measurement system 50 optionally includes a visualization module (not shown), which is used to render user interface 48 via display 46. The user interface 48 may include a graph 52 having an abscissa 56 of time and an ordinate 54 of any electrical indicator (for example, voltage). While in general the displayed data would be several series of data points, a curve 62 is displayed to indicate a software trace and a curve 58 is displayed to indicate a power consumption curve. Of course, any graphical indication may be employed. For example, any graphics primitives may be employed such as lines, dots, or boxes on a timeline. A power measurement graph may also be rendered, which using the synchronization techniques has been correctly aligned in time.

Referring to graph 52, a user or a software analysis program may retrieve information and perform computational analysis to derive information from analysis of graph 52 and/or the collected data itself. For example, by expanding areas of interest in the software trace activity at small enough time slices, the user and/or analysis program is able to analyze the precise power consumption levels during the execution of that activity. In one implementation, the user may chose the area of analysis to be that which, based on time logs, there are no other software components running that may add to the power measurement. This analysis may then be repeated, either automatically or manually, across the correlated traces whenever the particular software activity is run. In this way, a total physical energy cost for the activity may be calculated, e.g., by numeric integration. These determined values can then be used to compare the actual power and energy consumption of different implementations in order to optimize the software to provide for better power efficiency.

Other information may also be obtained. For example, the post-processing and visualization module 40 may have an idle power consumption module ("IPCM") 42 that may be used to establish and render an idle power consumption profile 64 on the user interface 48. Similarly, the post-processing and visualization module 40 may have a software operation power consumption module ("SOPCM") 44 that may be used to establish and render a software operation power consumption profile 66 on the user interface 48. The idle power consumption profile 64 and the software operation power consumption profile 66 may then be used to quantify the total cost of a particular software operation by analyzing the correlated power logs and software traces and performing a selective sum. For example, numeric integrations may be performed of both, and a comparison may be made of the idle power consumption profile 64 sum and that of various software operation power consumption profiles 66 to determine an optimum configuration.

Figure 2:
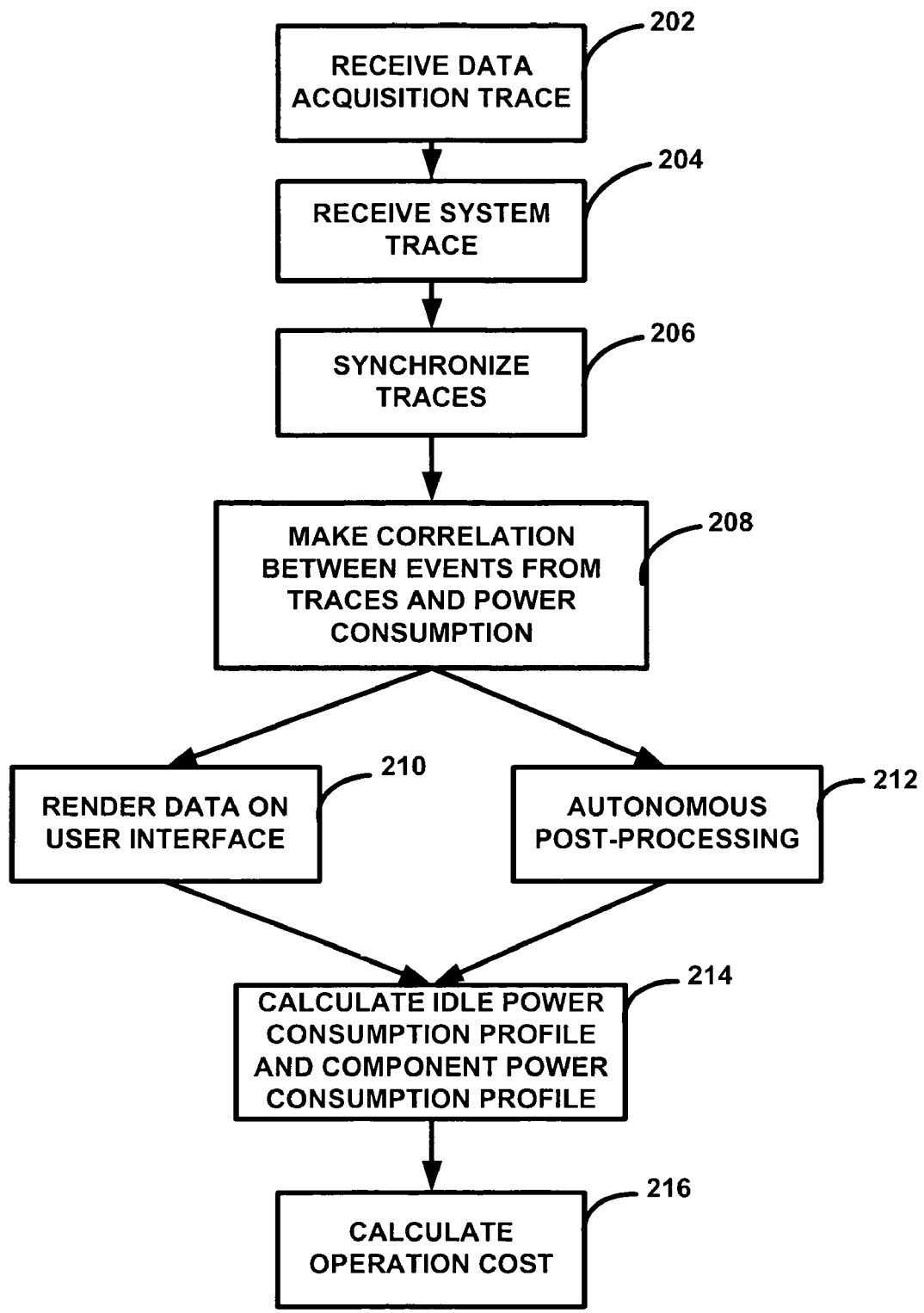
FIG. 2 is a flow chart of a method for quantifying energy consumption of a particular component of the system under test shown in FIG. 1.

With continuing reference to FIG. 1, FIG. 2 is a flowchart 70 of an exemplary method for quantifying energy consumption of a particular component of system under test 20, which is interfaced with or between an energy source, such as energy source 60. The method shown in FIG. 2 may be implemented in one or more general, multi-purpose, or single-purpose processors, such as processor 122 shown and discussed further below in connection with FIG. 6. Aspects of the illustrated method may be performed by networked servers/services or client-side devices. Unless specifically stated, the method is not constrained to a particular order or sequence. In addition, some of the described steps or elements can occur or be performed concurrently.

The method begins at step 202, where a data acquisition trace is received. As discussed above, an exemplary data acquisition trace 36 may include at least two channels. One channel is based on an analog or digital data stream comprising an electrical signal output from a measurement mechanism (such as data stream 24 output from measurement instrument 26) interfaced with or between the energy source, and another channel is based on an analog or digital data stream comprising an electrical signal output from an electrical interface of the computing system (such as data stream 14 output from electrical interface 80).

The method continues at step 204, where at least one system trace (for example, system trace 12) comprising data produced by a particular component of interest of the computing system) is received concurrently with the data acquisition trace.

At step 206, the traces are synchronized, as described above. A correlation is made between events detected within the traces and power consumption profile of the component of interest, as indicated at step 208. The correlation may generally constitute a number of actions, of varying complexity, from creating a database or array of joint data to simply preparing to render both on the same timeline on a user interface (as indicated at step 210). Alternatively, autonomous post-processing may be used, as indicated at step 212 to perform the correlation(s) indicated at step 208.

Step 214 provides for calculating an idle power consumption profile and a component operation power consumption profile, and at step 216, an operation cost is calculated.

Figure 3:
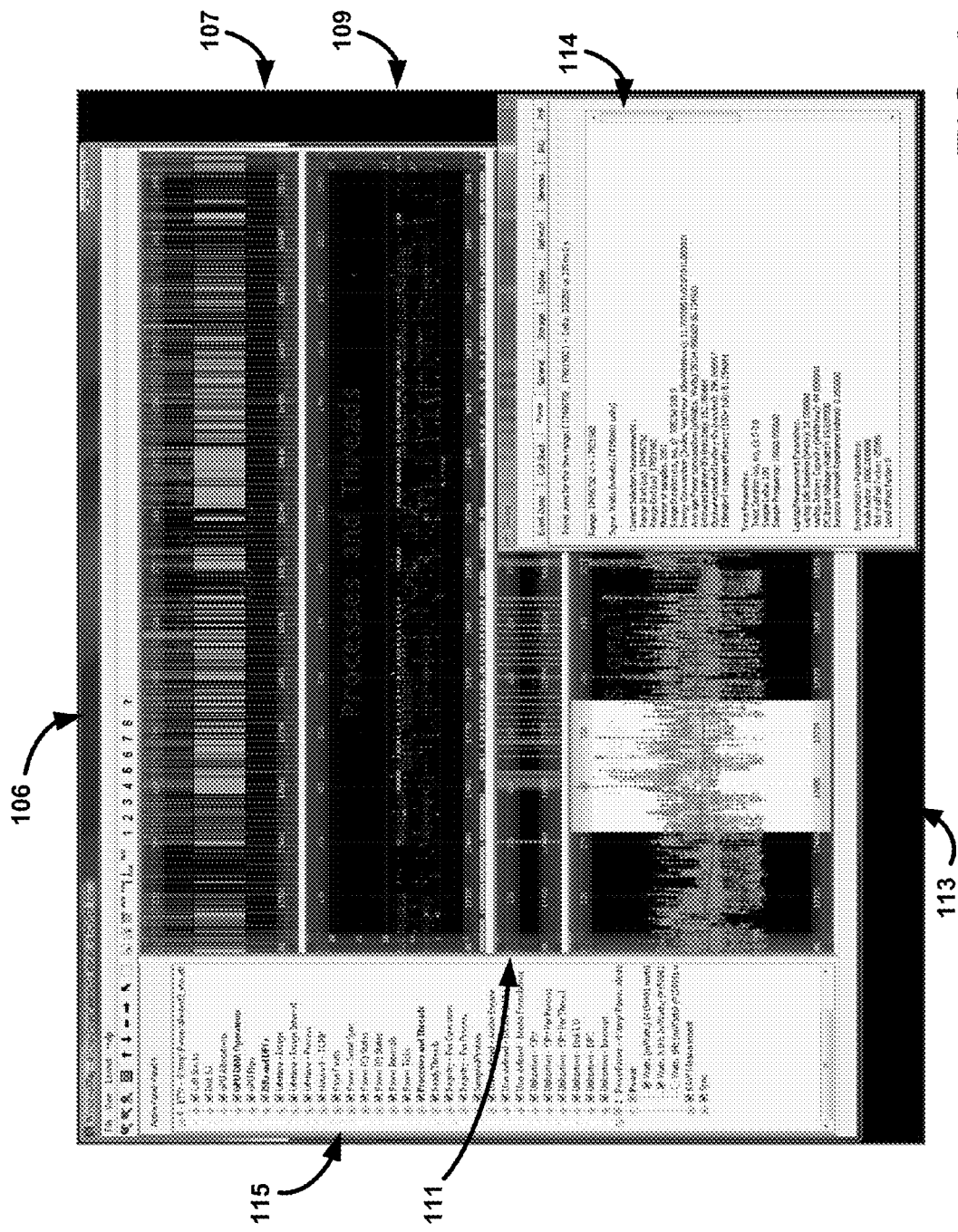
FIG. 3 is an exemplary output graph produced by the energy measurement system shown in FIG. 1, depicting certain software activity of a particular system under test as a function of time.
Figure 4:
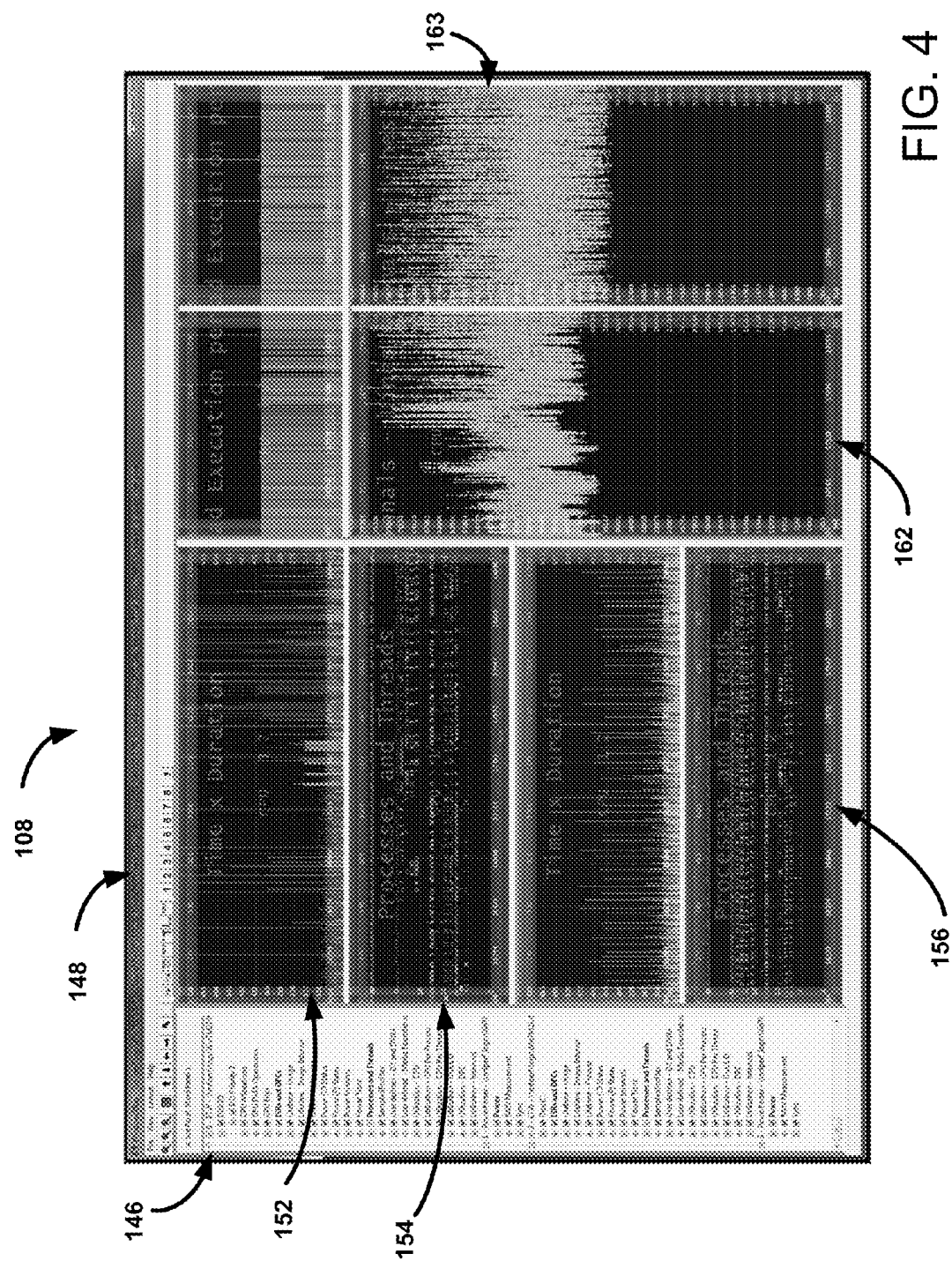
FIG. 4 is another exemplary output graph depicting certain software activity and power consumption of a particular system under test as a function of time, in this case comparing two scenarios.
Figure 5:
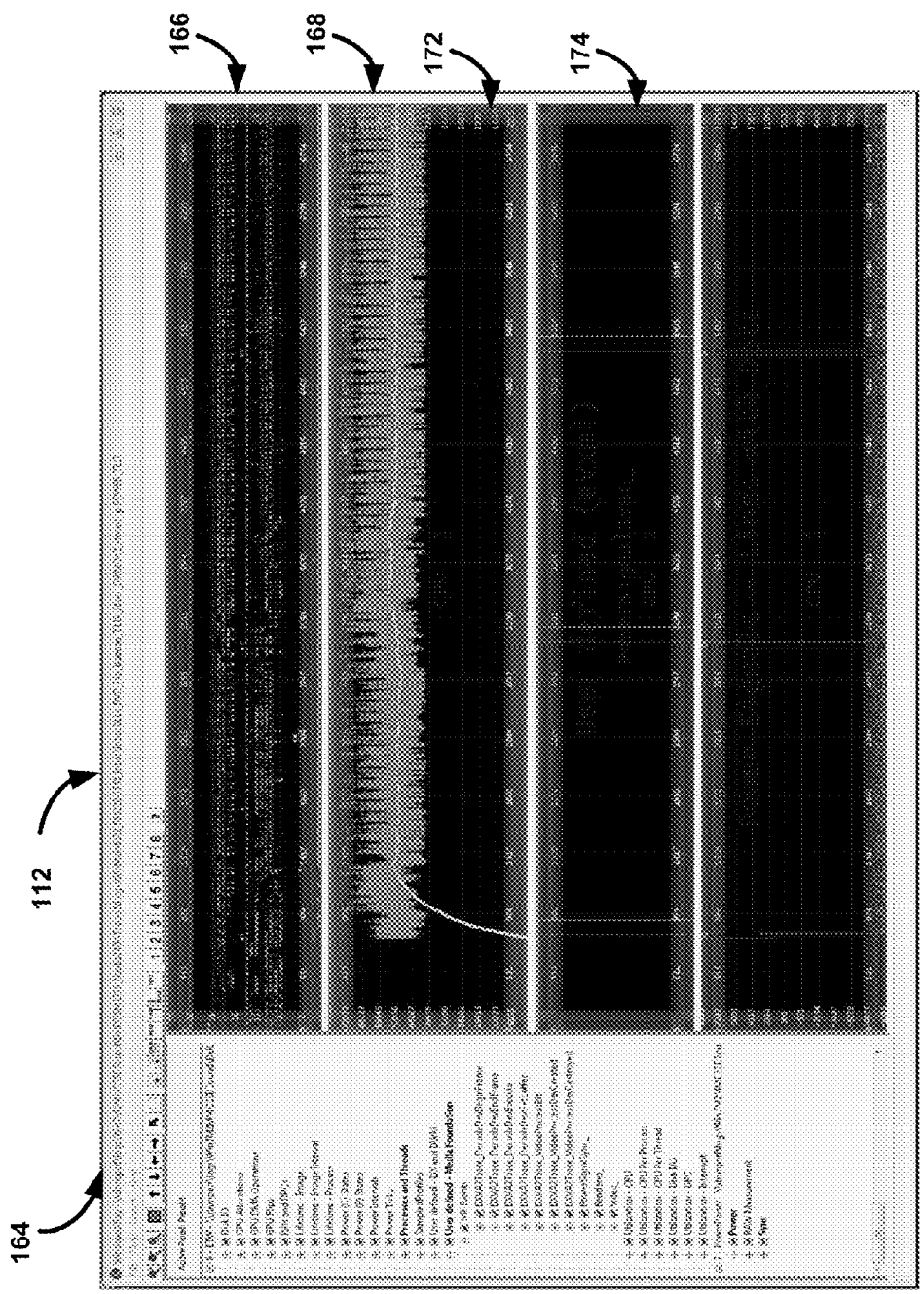
FIG. 5 is yet another exemplary output graph depicting certain software activity of a particular system under test as a function of time, in this illustrating a software synchronization signal and a captured electrical variation.

Exemplary profile data are shown in FIGS. 3-5. FIG. 3 is an exemplary output graph 106, showing certain software activity within system under test 20 as a function of time, via a user interface, such as UI 48. Data sets 107, 109, and 111 represent software traces. A list 115 may be displayed, and by highlighting certain elements, the software traces corresponding to those elements are displayed. The data set 113 shows a graph of the energy readings on a timeline, with the timeline coincident with those of data sets 107, 109, and 111. A popup dialog box 114 summarizes several energy metrics measured for the highlighted range in data set 113.

FIG. 4 depicts another exemplary output graph 108, which may be rendered via a UI such as UI 48. As with FIG. 3, a list 146 may be displayed, and by highlighting certain elements, the software traces corresponding to those elements are displayed. In FIG. 4, two scenarios are displayed, and by analysis of the power consumption of each scenario, a scenario may be deemed to be more power-optimized than the other, i.e., which scenario demands less total energy. In particular, software traces 148 and 152 are shown for a first scenario and software traces 154 and 156 are shown for a second scenario.

A power consumption data set 162 corresponds to the first and a power consumption data set 163 corresponds to the second scenario.

FIG. 5 depicts yet another output graph 112, which may also be rendered via a UI such as UI 48. As with FIGS. 3 and 4, a list 164 may be displayed, and by highlighting certain elements, the software traces corresponding to those elements are displayed. A data set 166 is displayed corresponding to a software trace, along with a data set 168 corresponding to power consumption. Plots 172 and 174 demonstrate a software synchronization signal and a captured electrical variation, respectively.

Accordingly, an arrangement and techniques for correlating power consumption to computing system activity have been described. Using the described arrangement and techniques, it is possible to provide a precise measurement setup that enables fine-grained correlation of component activity to energy consumption. The effects of any software optimization can be measured precisely instead of relying on intuition and/or abstract theory. Certain specific examples have been provided, but it will be understood that numerous variations of these examples may exist.

Figure 6:
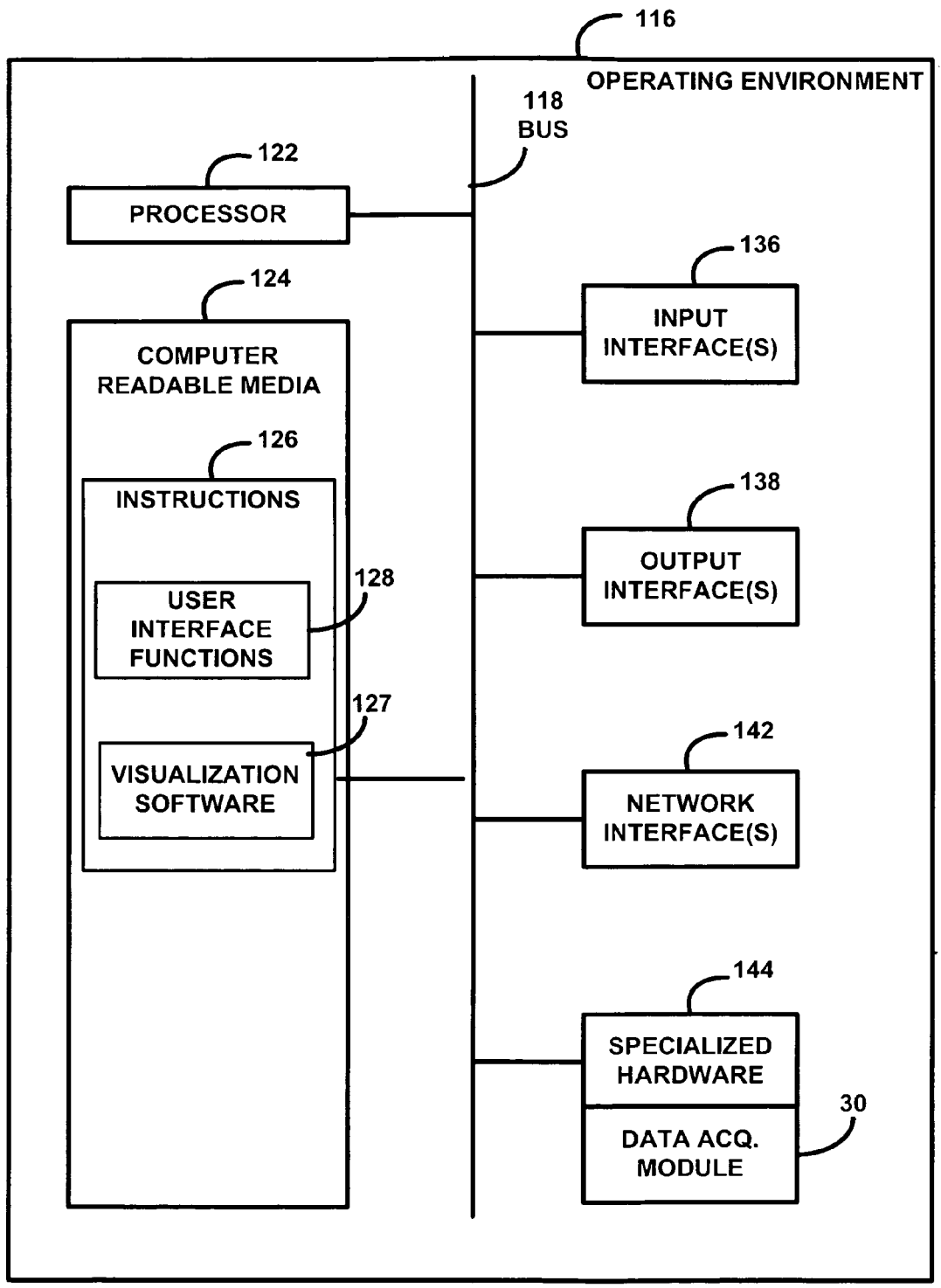
FIG. 6 is a simplified functional block diagram of an exemplary operating environment in which the system shown in FIG. 1 and/or the method illustrated in FIG. 2 may be implemented or used.

Referring again to the drawings, FIG. 6 is a block diagram of an exemplary configuration of an operating environment 116 (such as a client-side device or application or a networked server or service) in which all or part of the arrangement for correlating power consumption to software system activity and/or the methods shown and discussed in connection with the figures may be implemented or used. For example, the operating environment 116 may correspond to a subject computing device or a measurement computing device. Operating environment 116 is generally indicative of a wide variety of general-purpose or special-purpose computing environments, and is not intended to suggest any limitation as to the scope of use or functionality of the arrangements described herein.

As shown, operating environment 116 includes processor 122, computer-readable media 124, and computer-executable instructions 126. One or more internal buses 118 may be used to carry data, addresses, control signals, and other information within, to, or from operating environment 116 or elements thereof.

Processor 122, which may be a real or a virtual processor, controls functions of the operating environment by executing computer-executable instructions 126. The processor may execute instructions at the assembly, compiled, or machine-level to perform a particular process.

Computer-readable media 124 may represent any number and combination of local or remote devices, in any form, now known or later developed, capable of recording, storing, or transmitting computer-readable data, such as the above-noted computer-executable instructions 126, including user interface functions 128 and visualization software 127 employed by the post-processing and visualization module 40. In particular, the computer-readable media 124 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. The computer-readable media may also include transmission media and data associated therewith. Examples of transmission media/data include, but are not limited to, data embodied in any form of wireline or wireless transmission, such as packetized or non-packetized data carried by a modulated carrier signal.

Computer-executable instructions 126 represent any signal processing methods or stored instructions. Generally, computer-executable instructions 126 are implemented as software components according to well-known practices for component-based software development, and encoded in computer-readable media. Computer programs may be combined or distributed in various ways. Computer-executable instructions 126, however, are not limited to implementation by any specific embodiments of computer programs, and in other instances may be implemented by, or executed in, hardware, software, firmware, or any combination thereof.

Input interface(s) 136 are any now known or later developed physical or logical elements that facilitate receipt of input to operating environment 116. These inputs may include the synchronization signal and software traces noted above.

Output interface(s) 138 are any now known or later developed physical or logical elements that facilitate provisioning of output from operating environment 116.

Network interface(s) 142 represent one or more physical or logical elements, such as connectivity devices or computer-executable instructions, which enable communication between operating environment 116 and external devices or services, via one or more protocols or techniques. Such communication may be, but is not necessarily, client-server type communication or peer-to-peer communication. Information received at a given network interface may traverse one or more layers of a communication protocol stack.

Specialized hardware 144 represents any hardware or firmware that implements functions of operating environment 116. Examples of specialized hardware include the data acquisition module 30 above, encoders/decoders, decrypters, application-specific integrated circuits, clocks, and the like.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being applications or computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A method for quantifying energy consumption of a particular component of a computing system, the computing system receiving energy from an energy source, the method comprising:
   receiving a data acquisition trace including
      a first data acquisition trace channel based on a first analog or digital data stream comprising an electrical signal output from a measurement mechanism interfaced with or between the energy source, and
      a second data acquisition trace channel based on a second analog or digital data stream comprising an electrical signal output from an electrical interface of the computing system;
   concurrently with the data acquisition trace, receiving at least one system trace comprising data produced by the particular component of the computing system;
   receiving first synchronization data from the computing system via the at least one system trace;
   receiving second synchronization data from the computing system via the second data acquisition trace channel;
   based on the first and second synchronization data, logically aligning the data acquisition trace and the at least one system trace;
   based on the alignment, during execution of a predetermined test scenario by the computing system, monitoring the first data acquisition trace channel based on the at least one system trace; and
   based on the monitoring, quantifying energy consumption of the particular component of a computing system,
      wherein the method is performed by a network-side device or a client-side device.

2. The method according to claim 1, wherein the measurement mechanism comprises a resistor bank.

3. The method according to claim 1, wherein the electrical interface comprises a serial port pin.

4. The method according to claim 1, wherein the computing system comprises a portable consumer electronic device.

5. The method according to claim 1, wherein the electrical signal associated with the energy source comprises a current or a voltage.

6. The method according to claim 1, wherein the particular component of the computing system is selected from the group comprising: a software component; a hardware component; and a firmware component.

7. The method according to claim 6, wherein the software component is selected from the group comprising: a device firmware component; an operating system component; and an application component.

8. The method according to claim 1, wherein the steps of monitoring and quantifying are performed by a processor.

9. The method according to claim 1, wherein the step of monitoring comprises presenting to a user one or more items selected from the group comprising: the first data acquisition trace channel; the second data acquisition trace channel; the data acquisition trace; and the at least one system trace, and wherein the step of quantifying is performed by a user.

10. The method according to claim 1, wherein the step of monitoring comprises processing by an autonomous module one or more items selected from the group comprising: the first data acquisition trace channel; the second data acquisition trace channel; the data acquisition trace; and the at least one system trace, and wherein the step of quantifying is performed by a user.

11. The method according to claim 1, wherein the step of logically aligning comprises aligning based on time.

12. A method for quantifying energy consumption of a particular component of a computing system, the computing system receiving energy from an energy source, the method comprising:
   receiving a data acquisition trace including
      a first data acquisition trace channel based on a first analog or digital data stream comprising an electrical signal output from a measurement mechanism interfaced with or between the energy source, and
      a second data acquisition trace channel based on a second analog or digital data stream comprising an electrical signal output from an electrical interface of the computing system;
   concurrently with the data acquisition trace, receiving at least one system trace comprising data produced by the particular component of the computing system;
   receiving first synchronization data from the computing system via the at least one system trace;
   receiving second synchronization data from the computing system via the second data acquisition trace channel;
   based on the first and second synchronization data, logically aligning the data acquisition trace and the at least one system trace;
   based on the alignment, during execution of a predetermined test scenario by the computing system, monitoring the first data acquisition trace channel based on the at least one system trace; and
   based on the monitoring, quantifying energy consumption of the particular component of a computing system,
   wherein the step of quantifying energy consumption of the particular component of a computing system further comprises:
   calculating an idle power consumption profile of the particular component and an operation power consumption profile of the particular component, and comparing the idle power consumption profile and the operation power consumption profile to determine an incremental operational energy requirement of the particular component.

13. The method according to claim 1, further comprising:
   receiving at least one additional system trace from the computing system, the additional system trace corresponding to an individual hardware component of the computing system.

14. A system for quantifying energy consumption of a particular component of a computing system, the computing system receiving energy from an energy source, the system comprising:
   a data acquisition module configured to
      receive and sample a first analog or digital data stream comprising an electrical signal associated with the energy source, to produce a first data acquisition trace channel, and receive and sample a second analog or digital data stream comprising an electrical signal associated with an electrical interface of the computing system to produce a second data acquisition trace channel; and a processing module responsive to receive
the first data acquisition trace channel and the second data acquisition trace channel, and
at least one system trace comprising data produced by the computing system as a whole or by the particular component of the computing system or both,
when the processing module concurrently receives the first and second data acquisition trace channels and the at least one system trace, the processing module operable to perform a method comprising
receiving first synchronization data from the computing system via the at least one system trace,
receiving second synchronization data from the computing system via the second data acquisition trace channel,
based on the first and second synchronization data, logically aligning the first data acquisition trace channel and the at least one system trace,
based on the alignment, during execution of a predetermined test scenario executed by the computing system, monitoring the first data acquisition trace channel based on the at least one system trace, and
based on the monitoring, quantifying energy consumption of the particular component of a computing system,
wherein the step of quantifying energy consumption of the particular component of a computing system further comprises:
calculating an idle power consumption profile of the particular component and an operation power consumption profile of the particular component, and comparing the idle power consumption profile and the operation power consumption profile to determine an incremental operational energy requirement of the particular component.

15. The system according to claim 14, wherein the first synchronization data comprises data within the at least one system trace corresponding to a predetermined trace event sent by the computing system via the particular component.

16. The system according to claim 15, wherein the second synchronization data comprises data within the second analog or digital data stream corresponding to a predetermined signal sent by the computing system via the electrical interface.

17. The system according to claim 14, further comprising:
a user interface responsive to the processing unit, the user interface configured to present to a user one or more items selected from the group comprising: the first data acquisition trace channel; the second data acquisition trace channel; and the at least one system trace.

18. A computer-readable storage medium not comprising a propagated signal, encoded with computer-executable instructions which, when executed by a processor, perform a method for quantifying energy consumption of a particular component of a computing system, the computing system receiving energy from an energy source, the method comprising:
arranging for capturing a data acquisition trace, including
a first data acquisition trace channel based on a first analog or digital data stream comprising an electrical signal output from a measurement mechanism interfaced with or between the energy source, and
a second data acquisition trace channel based on a second analog or digital data stream comprising an electrical signal output from an electrical interface of the computing system;
arranging for capturing at least one system trace comprising data produced by the particular component of the computing system;
when the data acquisition trace and the at least one system trace are being concurrently captured, arranging for establishment of first synchronization data within the first data acquisition trace channel by causing the computing system to execute a predetermined trace event via the particular component;
when the data acquisition trace and the at least one system trace are being concurrently captured, arranging for establishment of second synchronization data within the at least one system trace by causing the computing system to send a predetermined signal via the electrical interface, the first and second synchronization data usable to logically align the first data acquisition trace channel and the at least one system trace; and
when the first data acquisition trace channel and the at least one system trace are aligned, causing execution of a predetermined test scenario by the computing system,
the first data acquisition trace channel and the at least one system trace monitored based on execution of the predetermined test scenario to quantify the energy consumption of the particular component
wherein the computer-readable storage medium is associated with a network-side device or a client-side device.

* * * * *